United States Patent Office 3,423,229
Patented Jan. 21, 1969

---

3,423,229
COATING WITH ZINC AND ALUMINUM
POWDER IN POTASSIUM SILICATE
Andrew J. Kompanek, Jr., Lansdale, Frederick L. Phelps, Jr., North Wales, and James M. Klotz, Quakertown, Pa., assignors to Teleflex, Incorporated, North Wales, Pa., a corporation of Delaware
No Drawing. Filed May 17, 1965, Ser. No. 456,552
U.S. Cl. 117—62          12 Claims
Int. Cl. B44d 1/44; C09c 1/64; B23c 11/06

ABSTRACT OF THE DISCLOSURE

A coating composition and method for coating wherein the coating consists essentially of a mixture of generally spherical shaped aluminum powder having a grain size of 10 microns or less and zinc powder in an aqueous solution of about 20 to 50 grams per 100 cc. water of a soluble metal silicate selected from the group consisting of potassium silicate and mixtures of potassium silicate and sodium silicate, the zinc powder and aluminum powder being in a ratio of from 1:1 to 1:9 and the combined powders being present in an amount of at least 100 grams per 100 cc. of said solution. After the composition is applied it is cured to water insolubility either by the application of an acid solution, preferably an acidic phosphate solution such as phosphoric acid, or by the application of heat.

---

The subject matter of the present invention is an improved coating and method for making same and, more particularly an improved inorganic base coating useful for decorative and protective purposes.

It is an object of the invention to provide an improved coating which has outstandingly good anti-corrosion characteristics but which is relatively inexpensive and can be applied at low cost.

Another object of the invention is the provision of an improved inorganic water-base coating, and method for applying same, which is relatively inexpensive and can be used for a variety of decorative and protective purposes.

Briefly, these objects are accomplished in accordance with the preferred embodiment of the invention by a coating which is formed by applying to the substrate surface to be coated a dispersion of fine grain spherical aluminum powder and zinc powder in an aqueous solution of potassium silicate, drying such coating and then applying an aqueous acidic solution, preferably aqueous phosphoric acid, to thereby cure the coating to water insolubility. Various additional ingredients can be included in the coating, for example coloring dyes or pigments where decorative effect is desired, germicide where germicidal properties are desired as for the coating of hospital equipment, anti-fouling ingredients as for example would be desired for the coating of building materials or the like. After the acid solution has been applied and dried, the coating is complete with no baking operation required. The coating is durable and tough, has excellent adhesion, is resistant to high temperatures and to salt spray and other corrosion and has other properties heretofore considered attainable only with baked vitreous type coatings. At the same time, however, the coating has good flexibility, far better than the characteristic of vitreous materials.

Other objects, features and advantages of the invention will appear more clearly from the following detailed description and examples of preferred and other embodiments thereof.

As alluded to above, the preferred silicate for the practice of the invention is potassium silicate. Sodium silicate can be used though not with comparable results particularly as regards corrosion protection. Mixtures of sodium silicate and potassium silicate can be used but the higher the percentage of potassium silicate in the mixture the better.

Commercially available potassium silicate solutions containing an alkali metal oxide-to-silica ratio of from about 1:2 to 1:30 are excellent. The preferred alkali metal oxide-to-silica ratio is 1:2.5. The concentration of the metal silicate in the aqueous solution can be from about 20 to 50 grams per 100 cc. water, about 35 grams potassium silicate per 100 cc. water being ideal for most applications of the coating. The silicate can be generated in the solution by using as ingredients hydrous silica plus potassium hydroxide; however it is much preferred to use potassium silicate to prepare the solution.

The combination of zinc and aluminum powders is important to the attainment of optimum corrosion characteristics. The aluminum in the coating appears to be sacrificial; i.e. under corrosive conditions it is gradually dissipated over the life of the coating. The aluminum powder should be extremely fine grain, preferably on the order of 10 microns or less and of generally spherical shape as in the so-called atomized aluminum powders as distinguished from the coarser flake aluminum powders conventionally used in aluminum paints and the like. The grain size and shape of the zinc powder is less important; powder with a grain size on the order of 20 microns or less is excellent.

The amount of the metal powder in the coating composition should be at least about 100 grams per 100 cc. of the aqueous silicate solution, 120 grams being ideal. Larger amounts up to as high as about 160 grams per 100 cc. of the silicate solution can be used if desired though to no sinificant advantage. For optimum corrosion protection the best ratio of aluinum powder to zinc powder is about 1:1, i.e. about 50% by weight aluminum and 50% by weight zinc; however, amounts as low as 10% of one and 90% of the other (i.e. ratios up to 1:9) can be used if desired.

The preferred curing solution for the coating is a dilute solution of phosphoric acid, or a soluble acidic hydrogen phosphate salt of a metal, with an addition of a water soluble polyhydroxy alcohol such as glycerol, glycol, or a glycol ether. The polyhydroxy alcohols adds viscosity and serves to lengthen and control the drying time thereby providing a better and more thorough cure. Other acidic solutions such as aqueous solutions of hydrochloric acid, sulfuric acid or nitric acid can be used instead of phosphoric acid if desired though there is no advantage but instead a disadvantage in doing so, particularly where the coating is applied to a ferrous or other metal substrate. The curing solution should preferably have a pH of approximately 2. It can be applied in any desired manner, for example spraying or dipping.

Chemical cure of the coating to water insolubility, accomplished by the application of the phosphoric or other acid, is much preferred for most uses of the coating. However, the coatings can, if desired, be heat cured to water insolubility as by heating to about 300° F., and such does serve to advantage in some instances. For example, the coatings are useful in many applications, in combination with an over-coat of a heat cured organic resin such as epoxy resin. Since heat must be applied anyway, in such embodiments, to cure the resin over-coat there is a cost advantage in eliminating the acid chemical cure, the heat applied for the resin cure being effective to also cure the undercoat.

The coatings of this invention are particularly useful on steel or other ferrous metal substrates to provide corrosion protection though they can be used with excellent results on any of a wide variety of other metal and non-metal substrates, for example, zinc, copper, plastics, paper, wood, glass, ceramic etc.

The following specific example will serve to further illustrate.

A solution was made by mixing 50 cc. potassium silicate (Bé° 28.4; $K_2O$ 7.9%, $SiO_2$ 19.8%, remainder $H_2O$) with 50 cc. $H_2O$ and to this was added 60 grams zinc powder (about 5 to 10 micron grain size) and 60 grams atomized aluminum powder (5–10 micron grain size). Such mixture was sprayed onto a steel panel and dried. After thorough drying, there was sprayed onto the coating a solution which had been prepared by mixing 7 cc. orthophosphoric acid (85% solution), 1 gram zinc oxide, 50 cc. glycerin and 50 cc. ethylene glycol monoether with 125 cc. water, such solution having a pH of about 1.9. After this curing solution was applied to the coating it was allowed to dry thereby completing the coating. The cured coating was insoluble in water, had excellent adhesion and provided excellent rust and other corrosion resistant properties.

As indicated above, coloring pigments or dyes or other ingredients to provide special chemical or physical characteristics can be included in the coating by admixture thereof in the alkali metal silicate zinc, aluminum powder aqueous dispersion.

It will be understood that while the invention has been described in detail with reference to a preferred embodiment thereof, various changes and modifications may be made all within the full and intended scope of the claims which follow.

The embodiments of the invention in which an exclusive property or privilege is claimed are defined as follows:

1. A method for coating comprising the steps of applying to a substrate surface a dispersion of generally spherical shaped aluminum powder having a grain size of about 10 microns or less and zinc powder in an aqueous solution of about 20 to 50 grams soluble metal silicate per 100 cc. water to thereby form a coating of such dispersion on said substrate, said soluble metal silicate being selected from the group consisting of potassium silicate and mixtures of potassium silicate and sodium silicate, said zinc powder and aluminum powder being in a ratio by weight of from 1:1 to 1:9 and the combined powders being present in an amount of at least 100 grams per 100 cc. of said solution; and then applying to said coating after it has dried an aqueous acidic solution containing ion selected from the group consisting of phosphate, chloride, sulfate and nitrate.

2. A method as set forth in claim 1 wherein all of said metal silicate is potassium silicate.

3. A method as set forth in claim 1 wherein said acidic solution comprises phosphate ion.

4. A method as set forth in claim 1 wherein said zinc powder and said aluminum powder are each present in about equal amounts.

5. A method as set forth in claim 1 wherein said metal silicate is present in said solution in an amount of about 35 grams per 100 cc. water and wherein said zinc powder and said aluminum powder are each present in an amount of about 60 grams per 100 cc. of said solution.

6. A method as set forth in claim 1 wherein the metal silicate has a ratio of metal oxide-to-silica of about 1:2.5

7. A method as set forth in claim 1 wherein said acidic solution contains a viscous water soluble material to increase the drying time of such solution.

8. A method for coating comprising the steps of applying to a substrate surface a dispersion of generally spherical shaped aluminum powder having a grain size of 10 microns or less and zinc powder in an aqueous solution of about 20 to 50 grams soluble metal silicate per 100 cc. water to thereby form a coating of such dispersion on said substrate, said metal silicate being selected from the group consisting of potassium silicate and mixtures of potassium silicate and sodium silicate, said zinc powder and aluminum powder being in a ratio by weight of from 1:1 to 1:9 and the combined powders being present in an amount of at least 100 grams per 100 cc. of said solution; and then applying heat to the coating to cure it to water insolubility.

9. A coating composition consisting essentially of a dispersion of generally spherical shaped aluminum powder having a grain size of 100 microns or less and zinc powder in an aqueous solution of from about 20 to 50 grams soluble metal silicate per 100 cc. water, said metal silicate being selected from the group consisting of potassium silicate and mixtures of potassium silicate and sodium silicate, said zinc powder and aluminum powder being in a ratio by weight of from 1:1 to 1:9 and the combined powders being present in an amount of at least 100 grams per 100 cc. of said solution.

10. A coating composition as set forth in claim 9 wherein all of said metal silicate is potassium silicate.

11. A coating composition as set forth in claim 9 wherein said zinc powder and aluminum powder are present in about equal amounts.

12. A coating composition as set forth in claim 9 wherein said silicate is present in said solution and in an amount of from about 35 grams per 100 cc. of water and wherein said zinc powder and aluminum powder are each present in an amount of about 60 grams per 100 cc. of said solution.

References Cited

UNITED STATES PATENTS

| | | | |
|---|---|---|---|
| 2,462,763 | 2/1949 | Nightingall | 117—131 |
| 2,509,875 | 5/1950 | McDonald | 117—131 |
| 2,540,108 | 2/1951 | Fisher | 106—84 |
| 2,944,919 | 7/1960 | Morris et al. | 117—135.1 X |
| 3,085,900 | 4/1963 | Lopata et al. | 117—131 X |
| 3,142,583 | 7/1964 | McMahon | 117—135.1 |
| 3,249,563 | 5/1966 | Balk | 106—290 X |

RALPH S. KENDALL, *Primary Examiner.*

U.S. Cl. X.R.

106—84, 290; 117—135.1, 169